United States Patent
Lun Li et al.

(10) Patent No.: US 9,728,983 B2
(45) Date of Patent: Aug. 8, 2017

(54) WEAK COMPONENT DETECTION FOR CHARGING CAPACITY CONTROL

(71) Applicant: Verizon Patent and Licensing Inc., Arlington, VA (US)

(72) Inventors: Yuk Lun Li, Morganville, NJ (US); Nanjun Qian, Princeton, NJ (US); Gopinath Venkatasubramaniam, Bridgewater, NJ (US); Manuel Enrique Caceres, Basking Ridge, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 351 days.

(21) Appl. No.: 14/564,668

(22) Filed: Dec. 9, 2014

(65) Prior Publication Data

US 2016/0164322 A1 Jun. 9, 2016

(51) Int. Cl.
*H02J 7/00* (2006.01)

(52) U.S. Cl.
CPC ......... *H02J 7/00* (2013.01); *H02J 2007/0096* (2013.01)

(58) Field of Classification Search
CPC ............ H02J 2007/0062; H02J 7/0052; H02J 7/0004; H02J 7/0029; H02J 7/0031; H02J 7/007; H02J 7/027; H02J 7/00; H02J 2007/0096

See application file for complete search history.

(56) References Cited

U.S. PATENT DOCUMENTS

| | | | |
|---|---|---|---|
| 9,158,325 B1 * | 10/2015 | Lim | H02J 7/0052 |
| 2011/0095722 A1 * | 4/2011 | Chang | H02J 7/0055 320/107 |
| 2015/0002077 A1 * | 1/2015 | Wang | H02J 7/0052 320/107 |

* cited by examiner

*Primary Examiner* — Nha Nguyen

(57) ABSTRACT

A charger and a mobile device exchange messages indicating that high wattage charging is supported over a bidirectional communication channel. After the message exchange, the charger sends a controlled output voltage and current to the mobile device over a cable connected between the charger and the mobile device. The mobile device takes an input voltage measurement that corresponds to the controlled output voltage after being passed through the cable. The charger or mobile device may then calculate a resistance of the cable based on a difference between the controlled output voltage and the input voltage measurement. Based on the resistance of the cable, the controlled voltage and current used to charge a battery of the mobile device is adjusted in order to avoid exceeding capacity of the cable.

20 Claims, 3 Drawing Sheets

WEAK COMPONENT DETECTION FOR CHARGING CAPACITY CONTROL

BACKGROUND

Conventional battery chargers for mobile devices and mobile devices have made use of proprietary connector and charging schemes. In order to enhance universality, today many mobile device chargers have converged on employing universal serial bus ("USB") connectors, including so-called micro-USB connectors, for charging.

Due to the prevalence of large capacity batteries to support cameras on a mobile device, large display sizes, etc., the charge times for a mobile device can be long. In order to reduce charge time, proprietary and standard charging schemes push up the voltage and/or current to deliver more wattage (i.e., power) from the charger to the battery of the mobile device. Unfortunately, when such fast charge methods are used, incompatibilities between the charger, mobile device, and connector/cord combination may create a hazardous situation.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1A:
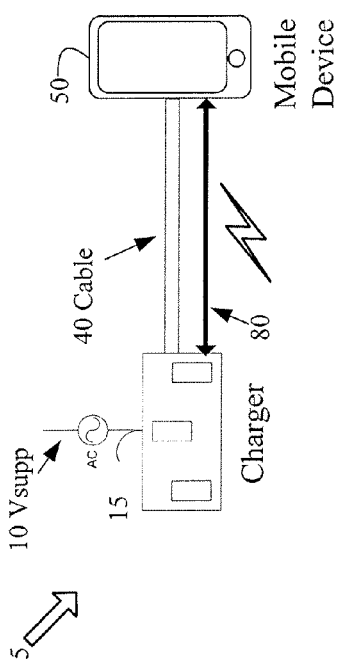
FIG. 1A is a high-level functional block diagram of an example of a system, including a mobile device charger and a mobile device, that supports weak component detection for charging capacity controls.

Reference now is made in detail to the examples illustrated in the accompanying drawings and discussed below. FIG. 1A illustrates a functional block diagram of an example of a system, including a mobile device charger and a mobile device, at least one of which supports weak component detection for charging capacity controls.

The illustrated system 5 includes an input voltage supply ("$V_{supp}$") 10, a charger 15, a cable component 40, and a mobile device 50. In our discussion, the charger 15 is a device for charging mobile devices and is used to replenish stored energy in a mobile device battery of the mobile device 50. In an example, charger 15 is a universal serial bus ("USB") to alternating current ("AC") adapter. The charger 15 connects to the cable 40 in order to impart direct current ("DC") charge to the mobile device 50 that is delivered from an AC input voltage supply 10. The cable 40 may be positioned between the charger 15 and the mobile device 50.

The charger 15 may be a wall charger. Alternatively, the charger 15 may be a computer host that mobile device 50 connects to via the cable 40. The charger 15 typically behaves as a rectifier unit that changes an AC power from the source 10 into DC power at voltage and current levels appropriate to charge the battery of the mobile device 50.

The cable 40 is a connector, such as an assembly of at least two wires or conductors that are run together through a conduit and bonded to form a single assembly. In one example, the cable 40 is a dock connector to USB cable, which provides charging and may support high-speed data transfer between charger 15 and mobile device 50. The cable 40 may be a pre-USB 3.0, USB 3.0, USB 3.1, or other USB connector device. On the charger end, the cable 40 typically has a standard USB plug type connector. The device end of the cable 40 may have a standard connector, such as a micro-USB plug type connector. Alternatively, that end of the cable 40 may have a plug of a type proprietary to the device manufacturer.

As shown, mobile device 50 is typically a regular mobile telephony device that may engage in data and voice services over a mobile communications network (not shown). Alternatively, mobile device 15 can be a laptop, personal digital assistant ("PDA"), smartphone, tablet computer, portable game or media player with wireless communication elements, or other portable device designed to communicate via one or more wireless networks, including a packet-switched network, such as the Internet, or circuit-switched transport networks.

The charger 15 and mobile device 50 communicate over a bidirectional communication channel ("bidirectional channel") 80, such as a physically wired or wireless connection. The bidirectional channel 80 may be a cable that includes one or more physical wires/conductors or a wireless medium. Although the bidirectional channel 80 is shown as a conduit that is a separate out-of-band connection from the cable 40, the bidirectional channel 80 may be bundled into the cable 40 or may be an in-band connection that exists within the cable 40. When the bidirectional channel 80 is wireless, the bidirectional channel 80 may be Bluetooth, Wi-Fi, near-field communication ("NFC"), radio frequency identifier ("RFID"), ultrasonic, and infrared, or other short range ("SR") network.

In the example, the charger 15, cable 40, and mobile device 50 can include a USB socket/port (not shown) that may be compliant with the USB 2.0 (or earlier), 3.0, or 3.1 standards. A pre-USB 3.0 device includes four pins or wires. The two inside pins/wires carry data (D+, which is green colored and D−, which is white colored). The outside two pins/wires provide a power supply, such as a variable current and voltage, and are red and black colored. A USB 3.0 or 3.1 device includes the same four pins/wires, but also includes a second row of five additional pins for improved data transfer speeds. Typically, a pre-USB 3.0 device can handle or provide 5.00 Volts ("V")±0.25 V at 0.5 Amperes ("A") to 0.9 A. A USB 3.0 or USB 3.1 device may handle or provide 5.00 V+0.25 to 0.55 V at up to 5 A.

When the charger 15 is a USB 3.0 compliant device having a standard downstream port, the charger 15 provides either 0.15 A or 0.9 A at 5 V, while simultaneously transmitting data at fast speeds. Alternatively, when charger 15 is a USB 3.0 compliant device having a dedicated charging port, the charger 15 may provide 1.5 A at 5 V when no data is transmitted.

In yet another example, when the charger 15 is a USB 3.1 device, the charger 15 supports three power profiles that allow mobile device 50 to request high current and supply voltages ranging from up to 2 A at 5 V for a power consumption (P=IV) of up to 10 Watts ("W"), up to 5 A at 12 V for a power consumption 60 W, or 5 A at 20 V for a power consumption of 100 W. Accordingly, the amount of current and voltage delivered over the power supply pins/wires of the USB socket/port depends on the type of USB port.

While the plugs from USB 2.0 (or earlier), USB 3.0, and USB 3.1 are backwards compatible in order to achieve interoperability, the consolidation to such common physical interfaces can create electrical hazards when the cable 40 is of a disparate standard than the charger 15 and mobile device 50. For example, a user may employ a charger 15 and mobile device 50 that are USB 3.1 compliant. Such USB 3.1 devices employ high wattage charging protocols that initially detect the charger 15 and mobile device 50 charge capabilities before applying a higher wattage. But if the cable 40 connector is a USB 2.0 (or earlier) cable or a low quality cable which is incapable of supporting high wattage charging protocols, a safety issue arises. Such safety issues may arise because neither the charger 15 nor device mobile 50 is aware that the cable 40 in between is a weak link. Accordingly, the system and methods discussed herein may be employed to detect the charge capacity of the cable 40 and make power adjustments to mitigate a potential hazard due to a weak link.

Figure 1B:
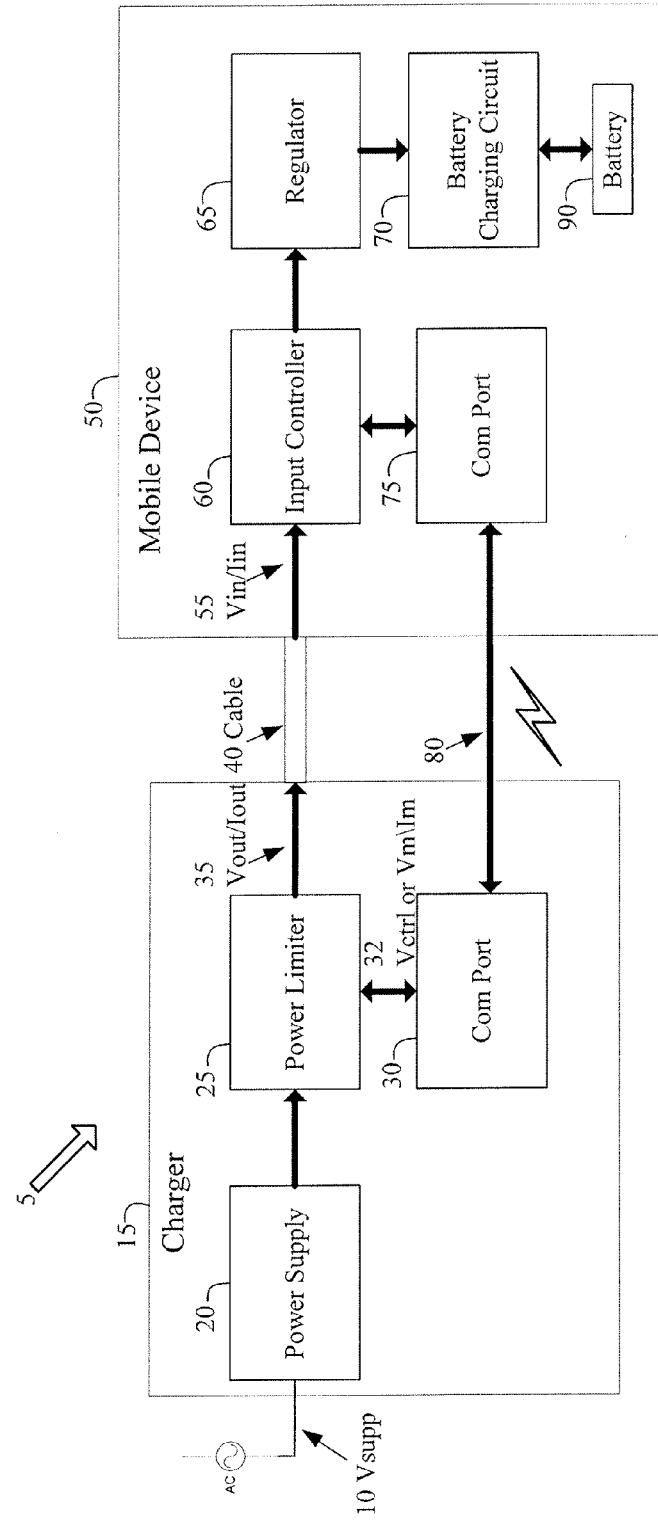
FIG. 1B is a block diagram showing internal components of the mobile device charger and the mobile device of FIG. 1A that provide weak component detection and charging power adjustments.

FIG. 1B illustrates a block diagram of internal components of the mobile device charger 15 and the mobile device 50 of FIG. 1A, one or both of which provide weak component detection and charging power adjustments. In the illustration, the charger 15 includes a power supply 20, a power limiter 25, and a communication port 30 ("com port"). The power supply 20 converts the input voltage supply ("$V_{supp}$") 10, typically an AC voltage source, into a DC voltage source. For example, the power supply 20 receives a 120 VAC source at 60 Hz and includes a transformer, a rectifier, a filter capacitor, and a resistor, in order to convert the AC voltage into a DC voltage that is delivered to power limiter 25.

In an example, the power limiter 25 receives the converted DC voltage from the power supply 20 as input and limits the output voltage ("$V_{out}$") and output current ("$I_{out}$") 35 based on a control signal ("$V_{ctrl}$") 32. In an example, the control signal 32 is a voltage or signal that governs the amount of output voltage and current 35. As shown, the com port 30 applies the control signal 32 in response to communications received over the bidirectional channel 80. In response to an increase in the control signal 32 that is received from the com port 30 from the mobile device 50 over the bidirectional channel 80, the microcontroller of power limiter 25 increases the output voltage and/or output current 35. In response to a decrease in the control signal 32 that is received from the com port 30, the microcontroller of power limiter 25 decreases the output voltage and/or output current 35.

The high wattage charging protocol communications can be set up by a user and/or application. In an example, when the user connects charger 15 and mobile device 50 via cable 40 and/or bidirectional channel 80, an application of mobile device 50 automatically initiates the communication protocols, as described in FIGS. 2-3. The application may initiate the protocols when the battery 90 of the mobile device 50 begins to charge or after a predetermined time interval (e.g., five seconds). In another example, after connecting charger 15 and mobile device 50 via cable 40 and/or bidirectional channel 80, the user may launch the application of mobile device 50 to manually initiate the high wattage charging protocols. The operating system of the mobile device 50 may also launch the application in response to detecting connection between the mobile device 50 and charger 15. Upon selecting a button on a graphical user interface of the application to initiate high wattage charging, the application initiates the protocols over the cable 40 and/or the bidirectional channel 80, as discussed in FIGS. 2-3.

Upon receiving the control signal 32, the output voltage 35 can be set by a variable regulator circuit that adjusts the output voltage 35 by using a digital potentiometer to create an adjustable voltage divider, for example. A digital potentiometer behaves as a variable resistor and may be controlled by digital signals received in messages or received from the microcontroller. When the control signal 32 is maintained, the microcontroller of power limiter 25 maintains the output voltage and/or output current 35. The initial output voltage and current 35 as well as the adjusted output voltage and current 35 may be indicated in a message transmitted to the mobile device 50 via the com port 30 so the sending levels are known for the voltage drop calculations performed by the mobile device 50 instead of the charger 15.

Alternatively, the power limiter 25 may limit the output voltage ("$V_{out}$") and output current ("$I_{out}$") 35 based on measurements of the input voltage and current signal ("$V_m \backslash I_m$") that are taken on the mobile device 50. Such measurements may be indicated in a message received via com port 30 and processed by the microcontroller of power limiter 25 to adjust the output voltage and output current 35. In an example, the power limiter 25 includes an automatic voltage regulator that can include a diode, capacitor, resistor, a microcontroller, and a digital-to-analog converter. The resistor can be a digital potentiometer that adjusts the output voltage and current 35 based on the digital signals received in messages or received from the microcontroller. The microcontroller can include a memory for digital storage of any sent output voltages and currents 35, determines adjustments to make to the output voltage and current 35 in a digital domain, and then converts the adjusted digital value into an analog output voltage and current 35 by way of the digital-to-analog converter and/or digital potentiometer.

For example, when the measured voltage ("$V_m$") and measured current ("$I_m$") 32 are less than the output voltage and current 35 that was previously delivered by the charger 15 to the mobile device 50, the power limiter 25 adjusts the output voltage and current 35 downwards. On the other hand, when the measured voltage and current 32 matches the output voltage and current 35 that was previously delivered by the charger 15 to the mobile device 50, the power limiter 25 adjusts the output voltage and current 35 upwards. Accordingly, iterative adjustments to the output voltage and current 35 may be performed until the voltage drop is eliminated and the capacity of the cable 40 is reached or nearly reached.

Certain losses may occur even when the cable 40 supports high wattage charging due to imperfections in system 5, for example. Hence, a predetermined voltage loss threshold and a predetermined current loss threshold may be specified to compensate for minute amounts of voltage and/or current losses in an electrical pathway between a coupled charger 15 and mobile device 50, including transmission via cable 40. In an example, the predetermined voltage loss threshold is set to 0.01 V and the predetermined current loss threshold is set to 0.01 A. Using such thresholds, even when there is a minute amount of voltage and current loss in a coupled system 5, upward adjustments to the output voltage and current 35 are still made. Accordingly, upward adjustments (instead of downward adjustments) occur when the difference between the measured voltage and current 32 and the output voltage and current 35 that was previously delivered by the charger 15 to the mobile device 50 are within the predetermined voltage loss threshold and the predetermined current loss threshold. The predetermined voltage loss threshold and the predetermined current loss threshold may be adjusted using an application on the mobile device 50.

The com port 30 (as well as the com port 75 of the mobile device 50) includes a data or network communication interface. The coin port 30 may use any available data communication technology, such as a wireless or wired communication. In a fixed installation, for example, the com port 30 may include a wired connection, such as USB for communication. The com port 30 allows the charger 15 to communicate with other devices, such as mobile device 50. As described above, the com port 30 may be connected to the cable 40 and provide an input to the one or more physical wires/conductors of the cable 40.

The com port 30 is shown as communicating with mobile device 50 over a bidirectional communication channel 80 that is a separate out-of-band connection from the cable 40. When com port 30 is a wireless out-of-band implementation, the com port 30 includes a Bluetooth, Wi-Fi, near-field communication ("NFC"), radio frequency identifier ("RFID)", ultrasonic, and infrared, or other short range ("SR") network transceiver.

As shown, the bidirectional channel 80 transmits data communication signals or messages indicating measured voltages and currents 32 or a control signal 32, and whether higher wattage charging is supported by the charger 15 or mobile device 50. The bidirectional channel 80 may be an in-band connection that exists within the cable 40. In such an in-band connection, the charger 15 and mobile device 50 communicate over a dedicated data line that is separate from the power line(s) within the cable 40. Alternatively, the data communication signal(s) may ride as an AC signal on top of a shared DC power line of the cable 40. When the power and data line is shared, an inductor may be used by the mobile device 50 to filter out the AC signal and a capacitor may be used by the charger 15 to couple AC into the DC line. Due to the presence of the capacitor and the inductor, having a separate lines for the data communication and power path within the cable 40 may be advantageous for small mobile device sizes.

As shown, the mobile device 50 includes an input controller 60. The input controller 60 receives an input voltage ("$V_{in}$") and input current ("$I_{in}$") 55, which corresponds to the output voltage and current 35 from the charger 15 after passing through the cable 40. The input controller 60 measures the input voltage and current 55. Based on the measurement, the input controller 60 calculates the resistance of the cable 40 and provides response commands to the com port 75 of the mobile 50 to deliver back to the charger 15 over the bidirectional channel 80. The resistance of the cable 40 is equal to the diameter (i.e., gauge) of the cable multiplied by the length of the cable. Based on the voltage drop across the cable 40 between the known output voltage and known current 35 to the measured input voltage and current 55, the input controller 60 can estimate the resistance of the cable 40.

The input controller 60 can include a microcontroller, an analog-to-digital converter, and a memory for storage and processing of the measured input voltage and current 55, the corresponding output voltage and current 35 that is received as data over the com port 75 via the bidirectional channel 80 from the charger 15, and estimated resistance value. Alternatively, the input controller 60 may relay the measurements of the input voltage and current 55 back to the com port 75 which, in turn, sends the measurements to the com port 30 of charger 15. The input controller 60 can store a digital representation of the estimated resistance value or measured input voltage and current 55 by processing those analog values with the analog-to-digital converter. The input controller 60 may be a pass through circuit that relays the input voltage and current 55 to the regulator without making any adjustments to the current and voltage levels. Alternatively, the input controller 60 may include a voltage divider that inhibits the input voltage and current 55 from being relayed to the regulator 65 to charge the battery 90 until a suitable high charging output voltage and current that complies with the capacity of the cable 40 is reached.

The mobile device 50 also includes a regulator 65 to stabilize the received input voltage and current 55 that is conveyed to the battery charging circuit 70. In an example, regulator 65 is a DC voltage stabilizer that protects the battery charging circuit 70 from short circuits and provides overvoltage protection. When such a safety issue occurs, the regulator 65 may shut down the mobile device 50.

As shown, the mobile device 50 also includes a battery charging circuit 70. To avoid overcharging of the battery 90 and cause permanent damage or dangerous conditions, the battery charging circuit 70 controls the current and voltage that is applied to the battery 90. The battery charging circuit 70 applies a constant DC voltage or pulsed DC charge to the battery 90. Because the mobile device 50 may receive a wide variety of voltage and current levels that are exceed the battery's threshold voltage, the battery charging circuit 50 ensures that the voltages and current are within the limits of the battery 90.

In an example, an alert (e.g., notification) may be displayed on a graphical user interface (GUI) of the mobile device 50 indicating incompatibility of the cable 40 to the user. Incompatibility signifies that the cable 40 has been found to not match the high charging capacity of the charger 15 and the mobile device 50 (e.g., a resistance is found during the throttling process). Alternatively, a light emitting diode ("LED") indicator of the mobile device 50 may flash to indicate incompatibility of the cable 40 when the display is turned off, for example. The alert informs the user that even though high wattage charging is supported by the charger 15 and mobile device 50, the cable 40 has been detected as a weak component, thus the maximum charge rate is not being used. When the cable 40 is sub-standard, the GUI may, with permission from the user (e.g., by selection of a button on the GUI), direct the user to a website portal where the user can purchase a high wattage charging compatible cable. In addition, when the mobile device 50 is used as business device, an additional information technology (IT) alert may be sent via email to appropriate IT personnel of the enterprise, for example, to address the incompatibility issue.

Figure 2:
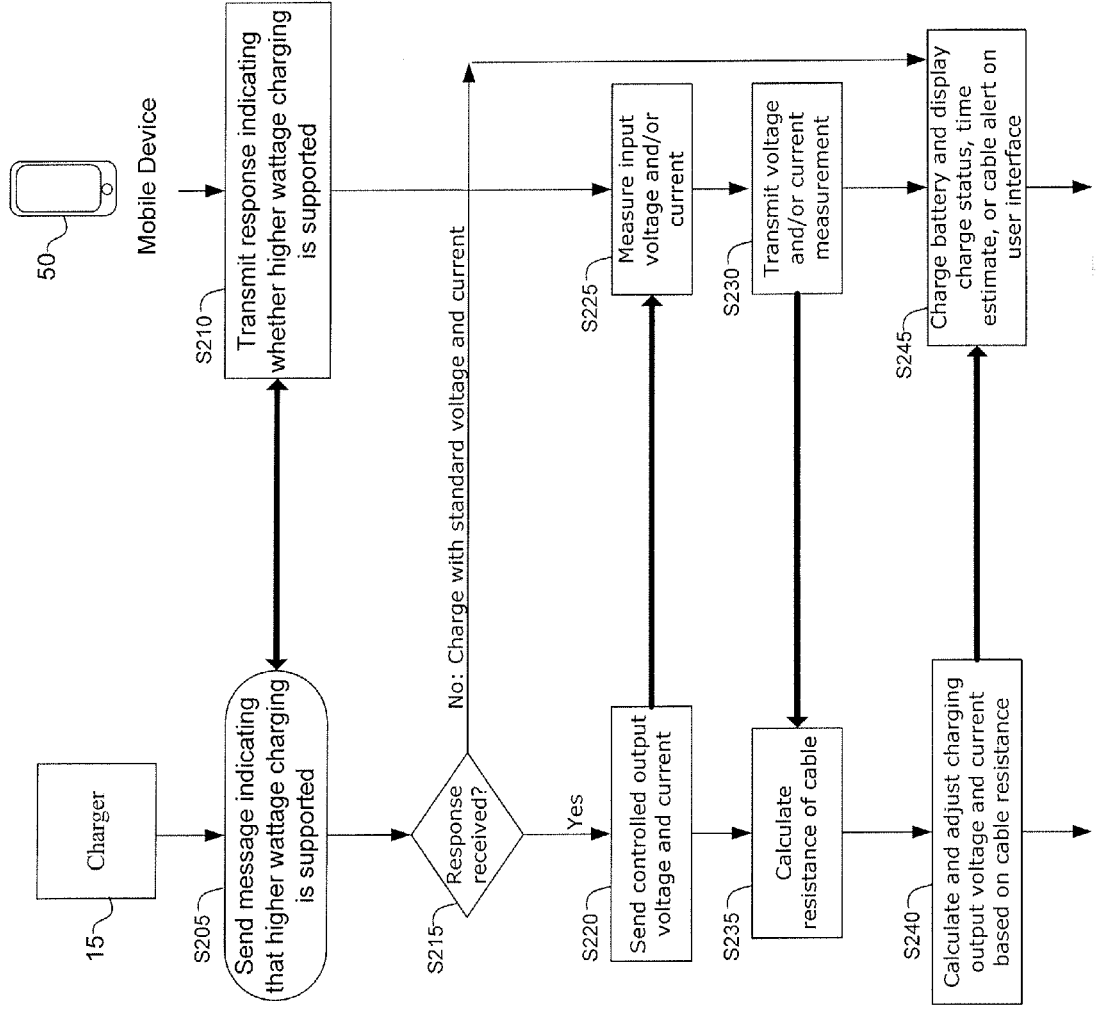
FIG. 2 is a flow chart of a procedure for weak component detection and charging power adjustments in the system of FIGS. 1A-B, in which the charger calculates the capacity of a weak cable component.

FIG. 2 illustrates a flow chart of a procedure for weak component detection and charging power adjustments in the system of FIGS. 1A-B, in which the charger 15 calculates the capacity of a weak cable component. In the illustrated example, the charger 15 is in communication with the mobile device 50 via a cable 40 (not shown) and/or a bidirectional channel 80 (not shown).

Beginning in step S205, the charger 15 sends a message to the mobile device 50 indicating that the charger 15 supports higher wattage charging. Alternatively, instead of a binary (yes/no) response message to indicate whether or not high wattage charging is supported, the response message may indicate amount(s) of maximum voltage and current levels, or the amount of maximum wattage, that is supported by charger 15. For example, the message may specify several different upper limits of high wattage charging that are supported by the charger 15. In one example, the response message specifies current and supply voltages up to 2 A at 5 V, or a power consumption (P=IV) of up to 10 W, is supported. In another example, the response message specifies that up to 5 A at 12 V, or a power consumption 60 W, is supported. In yet another example, the response message specifies that up to 5 A at 20 V, or a power consumption of 100 W, is supported.

The communication takes place over the bidirectional channel 80. Upon receiving the message, in step S210, the mobile device 50 transmits a response message indicating whether higher wattage charging is supported by the mobile device 50. On one side of the branch in step S215, the charger 15 fails to receive a response message from the mobile device 50 indicating whether the mobile device 50 supports high wattage charging within a predetermined time period (e.g., 10 seconds) or the mobile device 50 responds that high wattage charging is unsupported.

A predetermined number of retry messages may specify the maximum number of retry attempts that the charger 15 makes during the predetermined time period to send the message to the mobile device 50 indicating that the charger 15 supports higher wattage charging. The predetermined number of retry messages may also be used in conjunction with the predetermined time period to specify that, at or after each predetermined time period, a new retry message is sent to the mobile device 50 from the charger 15, until the number of retry messages is exceeded. When the predetermined number of retry messages (e.g., 5 messages) is exceeded without receiving a response message from the mobile device 50 indicating that high wattage charging is supported, the charger 15 finds that the mobile device 50 does not support high wattage charging. For example, a mobile device 50 that does not support high wattage charging may never transmit a response, thus while the charger 15 may look for that capability a response message is not received. Thus, the charger 15 imparts the mobile device 50 with a standard voltage and current charge level that will not result in high thermal loss leading to a fire hazard, such as an amount that does not exceed the pre-USB 3.0 voltage level of 5 V at 0.5 A to 0.9 A, and branches to step S245.

On the other hand, when the charger 15 receives a response message indicating that high wattage charging is supported by the mobile device 50, the charger 15 proceeds to step S220. As shown in step S220, the charger 15 sends a controlled output voltage and current to the mobile device 50. Initially, the charger 15 sends a low controlled output voltage and current, such as an amount that does not exceed the pre-USB 3.0 voltage level of 5 V at 0.5 A to 0.9 A, because the capacity of the cable 40 is still unknown.

Continuing now to step S225, the mobile device 50 measures the input voltage and current. Several measurements, such as two to five samples may be taken over a span of time, such as one to five seconds, to account for fluctuations (e.g., ripple) in the voltage line or shorts in the path between the charger 15 and the mobile device 50.

In step S230, one or more input voltage and current measurements are transmitted back to the charger 15. Alternatively, an average of the measurements may be transmitted to the charger 15. Upon receiving a voltage and current measurement(s) from the mobile device 50 in step S235, the charger 15 stores the voltage and current measurement(s) in a memory and calculates the resistance of the cable 40. When a plurality of voltage current and measurements/samples are received, the charger 15 may take an average to use for calculating the resistance of the cable 40. The resistance of the cable 40 is equal to the output voltage 35 minus the input voltage 55 and that difference is divided by the current, resulting in the relation $(V_{out}-V_{in})/I$. From the resistance, the capacity of the cable 40 may be determined because the resistance directly relates to the diameter (i.e., gauge) of the cable 40 multiplied by the length of the cable 40. Continuing now to step S240, the charger 15 adjusts the charging output voltage and current based on the cable resistance. When there is no resistance or the cable resistance is less than a resistance limit (e.g., 0.0001Ω to 0.2Ω), the output voltage 35 will match the input voltage 55 and cancel each other, thus the charger 15 drives the output voltage and/or output current 35 iteratively upwards in increments (e.g., 0.1 V, 0.25 V, 0.5 V or 0.1 A, 0.25 A, 0.5 A) until the resistance limit is reached. On the other hand, when the resistance limit is exceeded, the charger 15 drives the output voltage and/or output current 35 iteratively downwards in increments (e.g., 0.1 V, 0.25 V, 0.5 V or 0.1 A, 0.25 A, 0.5 A) until the resistance limit is no longer found to be exceeded.

The adjusted output voltage and current are stored in a memory of the charger 15 for subsequent and iterative resistance calculations. Consequently, when the resistance limit is reached when driving upwards or no longer found to be exceeded when driving downwards, the charger 15 uses the prior or last output voltage and current level, which is the highest value that did not generate a resistance that exceeds the resistance limit on the cable 40, in order to avoid exceeding the capacity of the cable 40. The resistance limit is a threshold resistance that may be determined ahead of time or determined dynamically. Such resistance limit generates little or no resistance and typically corresponds to the capacity of the cable 40. Hence, the charger 15 safely throttles the voltage and current for high power charging until the capacity of the cable 40 is reached or an acceptable range of the cable capacity is achieved.

In other words, based on the voltage drop across the cable 40 between the measured input voltage and current 55 and the corresponding output voltage and current 35, the charger 15 determines whether to drive output voltage and current up or down. When the cable 40 is insufficient to carry the full charging output voltage and current, the charger 15 falls back to a charging output voltage and current that the weakest component, such as the cable 40, can tolerate without exceeding capacity of the cable 40. Accordingly, iterative calculations and adjustments to the output voltage and current may be done until the voltage drop is eliminated by repeating steps S220 through S240.

Moving now to step S245, upon reaching a suitable high charging output voltage and current that complies with the capacity of the cable 40, the battery of the mobile device 50 is charged. During such charging, the mobile device 50 displays the charge status and an estimate of time remaining until the battery is fully charged on a graphical user interface. To calculate the estimate of time remaining until full charge, an application on the mobile device 50 first estimates the state of charge (SOC) of the battery. The SOC may be estimated using a voltage method that converts a reading of the battery voltage to SOC using a known discharge curve (i.e., voltage versus SOC). Alternatively, the SOC may be estimated using a current integration method that measures the current of the battery and integrates the current over time (i.e., Coulomb counting). Kalman filtering may also be used to combine the voltage and current integration methods to make adjustments to the SOC using an electrical model in real time.

Once the SOC is determined, a charging time model curve for the battery is used to calculate the estimate of time remaining. The charging time model curve is a table that maps a given SOC value and a given charging voltage and current (power) value to an estimate of time until full battery charge. The application uses the SOC as a first reference point to retrieve the estimate of time remaining using the charging time model curve for the battery. The high charging output voltage and current that complies with the capacity of the cable 40 is used as a second reference point (i.e., Watts) in the charging time model curve for the battery. Using the first and second reference points, the application retrieves an estimate of time remaining until the battery is fully charged for display on the graphical user interface.

The application may also adjust the estimate of time remaining upwards when a predetermined number of applications threshold (e.g., 10 applications) is exceeded by the number of applications running on the mobile device 50. The estimate of time remaining may also be adjusted upwards by the application when the screen of the mobile device 50 is turned on or when the brightness setting of the screen exceeds a predetermined brightness level threshold (e.g., eight on a scale of one to ten). Such adjustments may be displayed on the graphical user interface in addition to the initial estimate of time remaining from the charging time model curve.

In response to messages received from the charger 15 via bidirectional channel 80, if the cable has been found to not match the high charging capacity of the charger 15 and the mobile device 50 (e.g., a resistance is found during the throttling process), then an alert may be displayed on a graphical user interface of the mobile device 50 to indicate incompatibility of the cable 40. The alert may be an audible communication, such as an alarm sound. In another example, the alert may be a tactile communication, such as a sequence of one or more vibrations of the mobile device 50. In yet another example, the alert may be issued by transmitting an email message or a text message (e.g., short message service) to the user of the mobile device 50. Alternatively, a light emitting diode ("LED") indicator of the mobile device 50 may flash to indicate incompatibility of the cable 40 when the display is turned off, for example. The alert informs the user that even though high wattage charging is supported by the charger 15 and mobile device 50, the cable 40 has been detected as a weak component, thus the maximum charge rate is not being used. When the cable 40 is sub-standard, the graphical user interface may, with permission from the user, direct the user to a website portal where the user can purchase a high wattage charging compatible cable. In addition, the steps of FIG. 2 may be repeated when the mobile device 50 is charging to see if the cable tolerance changes due to thermal expansion of the cable 40, for example.

Figure 3:
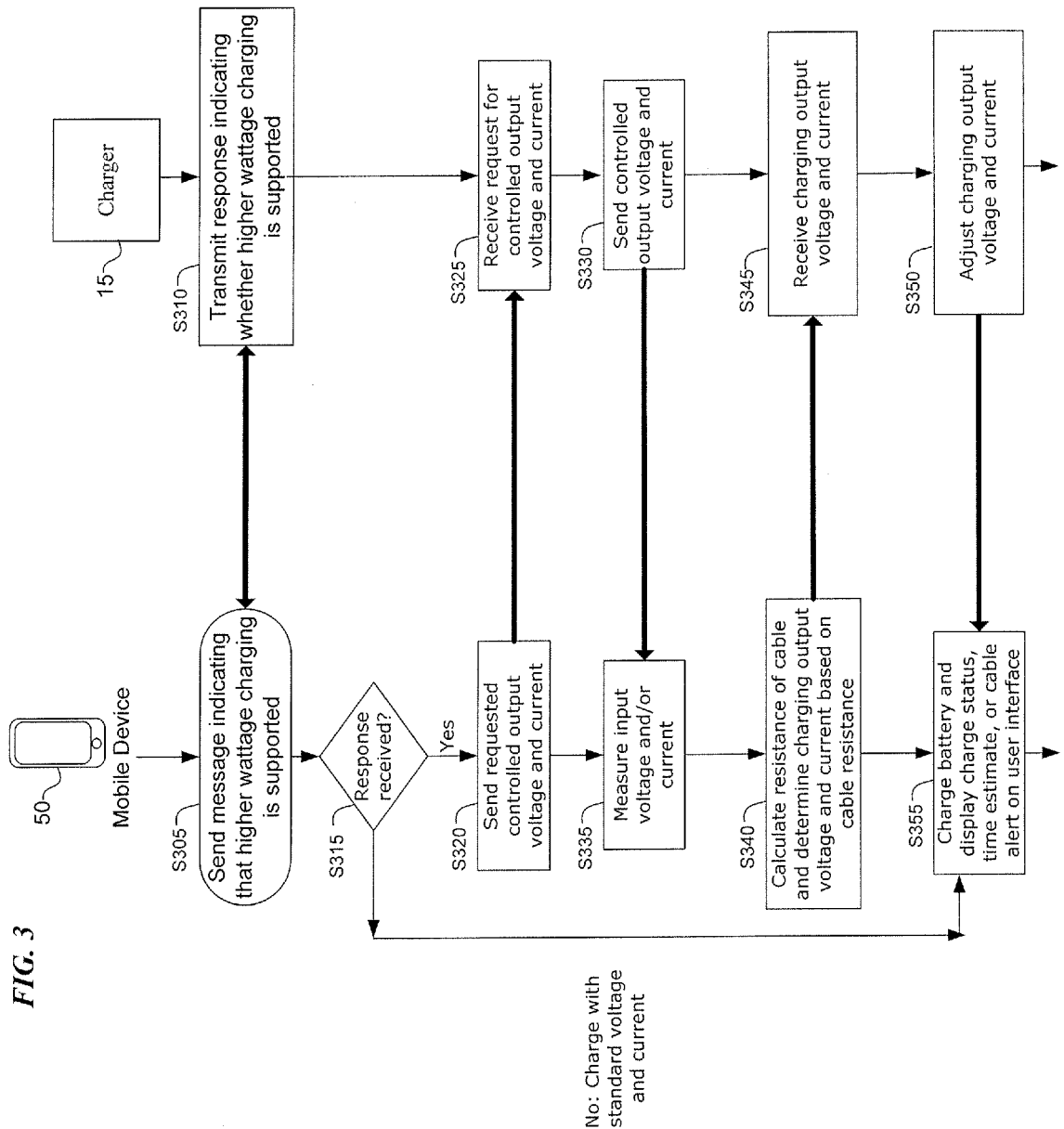
FIG. 3 is a flow chart of a procedure for weak component detection and charging power adjustments in the system of FIGS. 1A-B, in which the mobile device calculates the capacity of a weak cable component.

FIG. 3 illustrates a procedural flow for weak component detection and charging power adjustments in the system of FIGS. 1A-B, in which the mobile device 50 calculates the capacity of a weak cable component. In the illustrated example, the charger 15 is in communication with the mobile device 50 via a cable 40 (not shown) and/or a bidirectional channel 80 (not shown).

Beginning in step S305, the mobile device 50 sends a message to the mobile device charger 15 indicating that the mobile device 50 supports higher wattage charging. The communication takes place over the bidirectional channel 80. Upon receiving the message, in step S310, the charger 15 transmits a response message indicating whether higher wattage charging is supported by the charger 15.

Alternatively, instead of a binary (yes/no) response message to indicate whether or not high wattage charging is supported, the response message may indicate amount(s) of maximum voltage and current levels, or the amount of maximum wattage, that is supported by mobile device 50. For example, the message may specify several different upper limits of high wattage charging that are supported by the charger 15. In one example, the response message specifies current and supply voltages up to 2 A at 5 V, or a power consumption (P=IV) of up to 10 W, is supported. In another example, the response message specifies up to 5 A at 12 V, or a power consumption 60 W, is supported. In yet another example, the response message specifies that 5 A at 20 V, or a power consumption of 100 W, is supported.

On one side of the branch in step S315, the mobile device 50 fails to receive a response message from the charger 15 indicating whether the charger 15 supports high wattage charging within a predetermined time period (e.g., 10 seconds) or the charger 15 responds that high wattage charging is unsupported.

A predetermined number of retry messages may specify the maximum number of retry attempts that the mobile device 50 makes during the predetermined time period to send the message to the charger 15 indicating that the mobile device 50 supports higher wattage charging. The predetermined number of retry messages may also be used with the predetermined time period to specify that, at or after each predetermined time period, a new retry message is sent to the charger 15 from the mobile device 50, until the number of retry messages is exceeded. When the predetermined number of retry messages (e.g., 5 messages) is exceeded without receiving a response message from the charger 15 indicating that high wattage charging is supported, the mobile device 50 finds that the charger 15 does not support high wattage charging. For example, a charger 15 that does not support high wattage charging may never transmit a response, thus while the mobile device 50 may look for that capability a response message is not received. Thus, the charger 15 imparts the mobile device 50 with a standard voltage and current charge level that will not result in high thermal loss leading to a fire hazard, such as an amount that does not exceed the pre-USB 3.0 voltage level of 5 V at 0.5 A to 0.9 A, and branches to step S355.

On the other hand, when the mobile device 50 receives a response message indicating that high wattage charging is supported by the charger 15, the mobile device 50 proceeds to step S320. As shown in step S320, the mobile device 50 sends a request to the charger 15 for a specified and initially low controlled output voltage and current to be delivered to the mobile device 50. The specified controlled output voltage and current can be an amount that does not exceed the pre-USB 3.0 voltage level of 5 V at 0.5 A to 0.9 A, because the capacity of the cable 40 is still unknown. In step S325, the charger 15 receives the request and in step S330, the charger 15 sends that specified controlled output voltage and current.

Continuing now to step S335, the mobile device 50 measures the input voltage and current. Several measurements, such as two to five samples may be taken over a span of time, such as one to five seconds, to account for fluctuations (e.g., ripple) in the voltage line or shorts in the path between the charger 15 and the mobile device 50. Each of the voltage and current measurements are stored in a memory of the mobile device 50.

Moving to step S340, the mobile device 50 calculates the resistance of the cable 40. The resistance of the cable 40 is equal to the output voltage 35 minus the input voltage 55 and that difference is divided by the current, resulting in the relation $(V_{out}-V_{in})/I$. An average of the measurement samples may be calculated to use as $V_{in}$. From the resistance, the capacity of the cable 40 may be determined because the resistance directly relates to the diameter (i.e., gauge) of the cable 40 multiplied by the length of the cable 40.

Next, the mobile device 50 determines the adjustment to make to the charging output voltage and current based on the cable resistance and conveys that adjusted output voltage and current to the charger 15 via bidirectional channel 80. When there is no cable resistance or the cable resistance is less than a resistance limit (e.g., 0.0001Ω to 0.2Ω), the output voltage 35 will match the input voltage 55 and cancel each other, thus the mobile device 50 determines that the charger 15 should drive the output voltage and/or output current 35 iteratively upwards in increments (e.g., 0.1 V, 0.25 V, 0.5 V or 0.1 A, 0.25 A, 0.5 A) until the resistance limit is reached. On the other hand, when the resistance limit is exceeded, the mobile device 50 determines that the charger 15 should drive the output voltage and/or output current 35 iteratively downwards in increments (e.g., 0.1 V, 0.25 V, 0.5 V or 0.1 A, 0.25 A, 0.5 A) until the resistance limit is no longer found to be exceeded. The mobile device 50 sends messages requests via bidirectional channel 80 to the charger 15 to indicate the throttling adjustments to the controlled output voltage and current 35.

The adjusted output voltage and current are stored in a memory of the mobile device 50 for subsequent and iterative resistance calculations. Consequently, when the resistance limit 1 is found to be reached when driving upwards or no longer found to be exceeded when driving downwards, the mobile device 50 sends a message command to the charger 15 requesting the prior or last output voltage and current level, which is the highest value that did not generate a resistance that exceeds the resistance limit on the cable 40, in order to avoid exceeding the capacity of the cable 40. Hence, the mobile device 50 causes the charger 15 to safely throttle the voltage and current for high power charging until the capacity of the cable 40 is reached or an acceptable range of the cable capacity is achieved.

In other words, based on the voltage drop across the cable 40 between the measured input voltage and current 55 and corresponding output voltage and current 35, the mobile device 50 determines whether to cause the charger 15 to drive the output voltage and current up or down. When the cable 40 is insufficient to carry the full charging output voltage and current, the mobile device 50 sends a message to the charger 15 to fall back to a charging output voltage and current that the weakest component, such as the cable 40, can tolerate without exceeding capacity. The mobile device 50 sends the adjusted output voltage and current request message to the charger 15 via the bidirectional channel 80. Accordingly, iterative adjustments to the output voltage and current 35 may be done until the voltage drop is eliminated by repeating steps S320 through S340.

Continuing now to step S345, the charger 15 receives the adjusted output voltage and current request message from the mobile device 50. In step S350, upon reaching a suitable high charging output voltage and current that complies with the capacity of the cable 40, the battery of the mobile device 50 is charged with the adjusted output voltage and current level. As shown in step S355, during such charging, the mobile device 50 displays the charge status and an estimate of time remaining until the battery is fully charged on a graphical user interface.

To calculate the estimate of time remaining until full charge, an application on the mobile device 50 first estimates the state of charge (SOC) of the battery. The SOC may be estimated using a voltage method that converts a reading of the battery voltage to SOC using a known discharge curve (i.e., voltage versus SOC). Alternatively, the SOC may be estimated using a current integration method that measures the current of the battery and integrates the current over time (i.e., Coulomb counting). Kalman filtering may also be used to combine the voltage and current integration methods to make adjustments using an electrical model in real time.

Once the SOC is determined, a charging time model curve for the battery is used to calculate the estimate of time remaining. The charging time model curve is a table that maps a given SOC value and a given charging voltage and current (power) value to an estimate of time until full battery charge. The application uses the SOC as a first reference point to retrieve the estimate of time remaining using the charging time model curve for the battery. The high charging output voltage and current that complies with the capacity of the cable 40 is used as a second reference point (i.e., Watts) in the charging time model curve for the battery. Using the first and second reference points, the application retrieves an estimate of time remaining until the battery is fully charged for display on the graphical user interface.

The application may also adjust the estimate of time remaining upwards when a predetermined number of applications threshold (e.g., 10 applications) is exceeded by the number of applications running on the mobile device 50. The estimate of time remaining may also be adjusted upwards by the application when the screen of the mobile device 50 is turned on or when the brightness setting of the screen exceeds a predetermined brightness level threshold (e.g., eight on a scale of one to ten). Such adjustments may be displayed on the graphical user interface in addition to the initial estimate of time remaining from the charging time model curve.

In addition, if the cable has been found to not match the high charging capacity of the charger 15 and the mobile device 50 (e.g., a resistance is found during the throttling process), then an alert may be displayed on a graphical user interface of the mobile device 50 to indicate incompatibility of the cable 40. The alert may be an audible communication, such as an alarm sound. In another example, the alert may be a tactile communication, such as a sequence of one or more vibrations of the mobile device 50. In yet another example, the alert may be issued by transmitting an email message or a text message (e.g., short message service) to the user of the mobile device 50. Alternatively, a light emitting diode ("LED") indicator of the mobile device 50 may flash to indicate incompatibility of the cable 40 when the display is turned off, for example. The alert informs the user that even though high wattage charging is supported by the charger 15 and mobile device 50, the cable 40 has been detected as a weak component, thus the maximum charge rate is not being used. When the cable 40 is sub-standard, the graphical user interface may, with permission from the user, direct the user to a website portal where the user can purchase a high wattage charging compatible cable. In addition, the steps of FIG. 3 may be repeated when the mobile device 50 is charging to see if the cable tolerance changes due to thermal expansion of the cable 40, for example.

Aspects of the methods of weak component detection for charging capacity controls as outlined above may be embodied in programming, for example, for a microcontroller in the power limiter 25 of a charger 15 or for a microcontroller in the input controller 60 of a mobile device 50. Program aspects of the technology may be thought of as "products" or "articles of manufacture" typically in the form of executable code and/or associated data that is carried on or embodied in a type of machine readable medium. Executable code, for example, may take the form of software, firmware, microcode or the like of a type suitable for execution by the particular processor hardware of the charger 15 and mobile device 50 so as to configure the respective equipment to perform functions like those discussed herein.

"Storage" type media include any or all of the tangible memory of the computers, mobile devices, processors or the like, or associated modules thereof, such as various semiconductor memories, tape drives, disk drives and the like, which may provide non-transitory storage at any time for the programming. All or portions of the programming may at times be communicated through the Internet or various other telecommunication networks. Such communications, for example, may enable loading of the software or modules from one computer or processor into another, for example, from a management server or host computer of onto the charger 15 or mobile device 50. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to "non-transitory," "tangible" or "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s), mobile devices or the like, such as may be used to implement the secure payment processing techniques discussed herein. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
sending, by a charger device, a message to a mobile device over a bidirectional communication channel indicating that the charger device supports high wattage charging;
receiving, by the charger device and based on sending the message to the mobile device, a response message from the mobile device indicating that high wattage charging is supported by the mobile device;
sending, by the charger device and based on receiving the response message, a controlled output voltage and an output current to the mobile device over a cable connected between the charger device and the mobile device,
the cable being for carrying voltage and current to charge a battery of the mobile device;
receiving, by the charger device, an input voltage measurement from the mobile device based on sending the controlled output voltage;
calculating, by the charger device, a resistance of the cable based on a difference between the controlled output voltage and the input voltage measurement; and
adjusting, by the charger device, at least one of the controlled output voltage or the output current of the charger device based on the resistance of the cable not satisfying a resistance limit,
an indication of incompatibility of the cable being provided, for display, on a graphical user interface of the mobile device based on the resistance limit being exceeded,
the indication indicating that the cable does not match a charging capacity of the charger device and the mobile device.

2. The method of claim 1, further comprising:
throttling, based on the resistance of the cable not satisfying the resistance limit, the controlled output voltage upwards;
storing a throttled controlled output voltage value and a current value in a memory; and
sending a throttled controlled output voltage and the output current over the cable to the mobile device.

3. The method of claim 2, where the resistance of the cable is a first resistance and where the input voltage measurement is a first input voltage measurement, and
where the method further comprises:
receiving a second input voltage measurement from the mobile device based on sending the throttled controlled output voltage and the output current over the cable to the mobile device; and
calculating a second resistance of the cable based on a difference between the throttled controlled output voltage and the second input voltage measurement.

4. The method of claim 1, further comprising:
retrieving from a memory a highest controlled output voltage value and a current value that did not exceed the resistance limit based on determining that the resistance limit is satisfied; and
charging the mobile device using the highest controlled output voltage value and the current value.

5. The method of claim 1, where the message is a first message, and
where the method further comprises:
transmitting a second message to the mobile device indicating that the cable does not match the charging capacity of the charger device and the mobile device based on the resistance limit being exceeded.

6. The method of claim 1, further comprising:
throttling downwards, based on the resistance of the cable exceeding the resistance limit, the controlled output voltage or the output current;
storing a throttled controlled output voltage value or a throttled output current value in a memory; and
sending a throttled controlled output voltage or a throttled output current over the cable to the mobile device.

7. The method of claim 6, where the resistance of the cable is a first resistance and the input voltage measurement is a first input voltage measurement, and
where the method further comprises:
receiving a second input voltage measurement from the mobile device corresponding to the throttled controlled output voltage after passing through the cable; and
calculating a second resistance of the cable based on a difference between the throttled controlled output voltage and the second input voltage measurement.

8. The method of claim 1, further comprising:
retrieving, based on the resistance limit no longer being exceeded and from a memory, a highest controlled output voltage that did not exceed the resistance limit; and
charging the mobile device using the highest controlled output voltage.

9. The method of claim 1, where receiving the input voltage measurement comprises:
receiving the input voltage measurement as a plurality of samples; and
where the method further comprises:
calculating an average of the plurality of the samples to use as the input voltage measurement for calculating the resistance of the cable.

10. A method comprising:
sending, by a mobile device, a message to a charger device over a bidirectional communication channel indicating that the mobile device supports high wattage charging;
receiving, by the mobile device, a response message from the charger device indicating that high wattage charging is supported by the charger device;
requesting, by the mobile device and based on receiving the response message, a controlled output voltage and output current to be delivered to the mobile device over a cable, connected between the charger device and the mobile device, for carrying output voltage and current to charge a battery of the mobile device;
measuring, by the mobile device, an input voltage at the mobile device corresponding to the controlled output voltage after passing through the cable;
calculating, by the mobile device, a resistance of the cable based on a difference between the controlled output voltage and a input voltage measurement;
determining, by the mobile device, an adjustment to the controlled output voltage or the output current based on the resistance of the cable;
transmitting, by the mobile device, an adjusted controlled output voltage or an adjusted output current to the charger; and providing, by the mobile device and for display, a graphical user interface indicating that the cable does not match a charging capacity of the charger device and the mobile device based on a resistance limit being exceeded.

11. The method of claim 10, where the message is a first message, and
where the method further comprises:
sending, based on the resistance limit not being satisfied, a second message over the bidirectional communication channel to the charger device requesting that the controlled output voltage be throttled upwards to a throttled controlled output voltage; and
storing a throttled controlled output voltage value in a memory.

12. The method of claim 11, where the resistance of the cable is a first resistance, the input voltage is a first input voltage, and the input voltage measurement is a first input voltage measurement, and
where the method further comprises:
measuring, based on sending the second message, a second input voltage corresponding to the throttled controlled output voltage after passing through the cable; and
calculating a second resistance of the cable based on a difference between the throttled controlled output voltage and a second input voltage measurement.

13. The method of claim 10, where the message is a first message, and
where the method further comprises:
retrieving, based on the resistance limit being satisfied and from a memory a highest controlled output voltage that did not exceed the resistance limit; and
sending a second message to the charger device requesting charging of the mobile device using the highest controlled output voltage.

14. The method of claim 10, where the message is a first message, and
where the method further comprises:
sending, based on the resistance limit being exceeded, a second message over the bidirectional communication channel requesting that the controlled output voltage be throttled downwards to a throttled controlled output voltage; and
storing a throttled controlled output voltage value in a memory.

15. The method of claim 14, where the resistance of the cable is a first resistance, the input voltage is a first input voltage, and the input voltage measurement is a first input voltage measurement, and
where the method further comprises:
measuring, based on sending the second message, a second input voltage corresponding to the throttled controlled output voltage after passing through the cable; and
calculating a second resistance of the cable based on a difference between the throttled controlled output voltage and a second input voltage measurement.

16. The method of claim 10, further comprising:
retrieving, based on the resistance limit no longer being exceeded and from a memory, a highest controlled output voltage that did not exceed the resistance limit; and
sending a second message to the charger device requesting charging of the mobile device using the highest controlled output voltage.

17. The method of claim 10, where receiving the input voltage measurement comprises:
receiving the input voltage measurement as a plurality of samples, and
calculating an average of the plurality of the samples to use as the input voltage measurement for calculating the resistance of the cable.

18. A mobile device comprising:
one or more processors to:
send a message to a charger device over a bidirectional communication channel indicating that the mobile device supports high wattage charging;
receive, based on sending the message, a response message from the charger device indicating that high wattage charging is supported by the charger device;
send, based on receiving the response message, a controlled output voltage and an output current to the charger device over a cable, connected between the charger device and the mobile device, for carrying the controlled output voltage and the output current to charge a battery of the mobile device;
calculate a resistance of the cable based on a difference between the controlled output voltage and an input voltage measurement corresponding to the controlled output voltage after passing through the cable;
determine an adjustment to the controlled output voltage or the output current based on the resistance of the cable; and
provide, for display, a graphical user interface an indication of incompatibility of the cable based on a resistance limit being exceeded,
the indication indicating that the cable does not match a charging capacity of the charger device and the mobile device.

19. The mobile device of claim 18, where the one or more processors are further to:
provide, based on receiving permission from a user via the graphical user interface, information regarding a website portal to purchase a high wattage charging compatible cable.

20. The mobile device of claim 18, where the one or more processors are further to:
adjust the controlled output voltage or the output current in increments based on determining that the resistance limit is satisfied.

* * * * *